United States Patent [19]

Popper et al.

[11] Patent Number: 4,860,610

[45] Date of Patent: Aug. 29, 1989

[54] WOUND ROTOR ELEMENT AND CENTRIFUGE FABRICATED THEREFROM

[75] Inventors: Peter Popper; William E. Velvel, both of Wilmington, Del.

[73] Assignee: E. I. Du Pont de Nemours and Company, Wilmington, Del.

[21] Appl. No.: 148,190

[22] Filed: Jan. 27, 1988

Related U.S. Application Data

[63] Continuation of Ser. No. 684,937, Dec. 21, 1984, abandoned.

[51] Int. Cl.[4] .......................... F16F 15/22; B04B 5/02

[52] U.S. Cl. .................................. 74/572; 74/573 R; 494/16; 428/80; 428/109

[58] Field of Search .................... 74/572, 573; 494/16, 494/81, 82; 428/80, 109, 110; 310/74, 153

[56] References Cited

U.S. PATENT DOCUMENTS

| | | | |
|---|---|---|---|
| 618,196 | 1/1899 | Ashworth et al. . | |
| 2,447,330 | 8/1948 | Grebmeier . | |
| 3,248,046 | 4/1966 | Feltman et al. . | |
| 3,262,231 | 7/1966 | Polch . | |
| 3,363,479 | 1/1968 | Pickels . | |
| 3,384,185 | 5/1968 | Fernandez | 170/160.53 |
| 3,401,876 | 9/1968 | Lucas | 494/16 |
| 3,672,241 | 6/1972 | Rabenhorst . | |
| 3,698,262 | 10/1972 | Rabenhorst . | |
| 3,737,694 | 6/1973 | Rabenhorst . | |
| 3,765,267 | 10/1973 | Bourquardez | 74/581 |
| 3,788,162 | 1/1974 | Rabenhorst et al. | 74/572 |
| 3,797,737 | 3/1974 | Kadotani et al. . | |
| 3,884,093 | 5/1975 | Rabenhorst . | |
| 3,913,828 | 10/1975 | Roy . | |
| 3,943,020 | 3/1976 | Ashton et al. . | |
| 3,950,115 | 4/1976 | Euler . | |
| 3,997,106 | 12/1976 | Baram . | |
| 4,000,665 | 1/1977 | Rabenhorst | 74/572 |
| 4,021,209 | 5/1977 | Binkley . | |
| 4,028,962 | 6/1977 | Nelson . | |
| 4,038,885 | 8/1977 | Jonda . | |
| 4,039,006 | 8/1977 | Inone et al. . | |
| 4,098,142 | 7/1978 | Weyler, Jr. | 74/572 |
| 4,116,018 | 9/1978 | Weible | 64/12 |
| 4,186,245 | 1/1980 | Gilman | 428/635 |
| 4,187,699 | 2/1980 | Weible | 64/12 |
| 4,207,755 | 6/1980 | Weible | 64/15 B |
| 4,207,778 | 6/1980 | Hatch | 74/572 |
| 4,227,857 | 10/1980 | Reyes | 416/134 A |
| 4,237,175 | 12/1980 | Kobayashi | 428/192 |
| 4,244,240 | 1/1981 | Rabenhorst | 74/572 |
| 4,255,087 | 3/1981 | Wackerle et al. . | |
| 4,266,442 | 5/1981 | Zorzi | 74/572 |
| 4,286,475 | 9/1981 | Friedericy et al. | 74/572 |
| 4,293,276 | 10/1981 | Brogdon et al. . | |
| 4,386,989 | 6/1983 | Aubry | 156/182 |
| 4,413,860 | 11/1983 | Prescott | 301/63 PW |
| 4,425,820 | 1/1984 | Swozil | 74/579 |
| 4,458,400 | 7/1984 | Friedericy et al. . | |
| 4,468,269 | 8/1984 | Carey . | |
| 4,481,840 | 11/1984 | Friedericy et al. | 74/572 |

FOREIGN PATENT DOCUMENTS

| | | | |
|---|---|---|---|
| 0033765 | 11/1980 | European Pat. Off. . | |
| 513713 | 12/1930 | Fed. Rep. of Germany | 74/572 |
| 600884 | 8/1934 | Fed. Rep. of Germany | 494/16 |
| 2741603 | 3/1978 | Fed. Rep. of Germany . | |
| 57-6143 | 1/1982 | Japan | 74/572 |
| 7606440 | 12/1977 | Netherlands | 74/572 |
| 1353390 | 5/1974 | United Kingdom . | |
| 2001290 | 1/1979 | United Kingdom . | |
| 2097297 | 11/1982 | United Kingdom . | |

*Primary Examiner*—Rodney M. Lindsey

[57] ABSTRACT

A centrifuge rotor is fabricated of a stacked plurality of tiers where each tier is formed from a stacked array of wound arms. Each arm is formed from an array of layered turns of anisotropic fibers having parallel side portions connected through curved end turn portions.

23 Claims, 8 Drawing Sheets

Fig. 17.
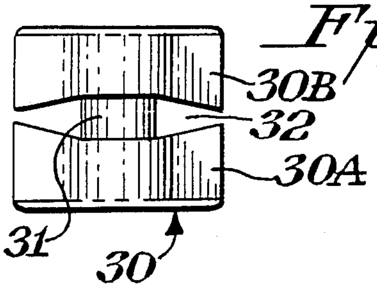
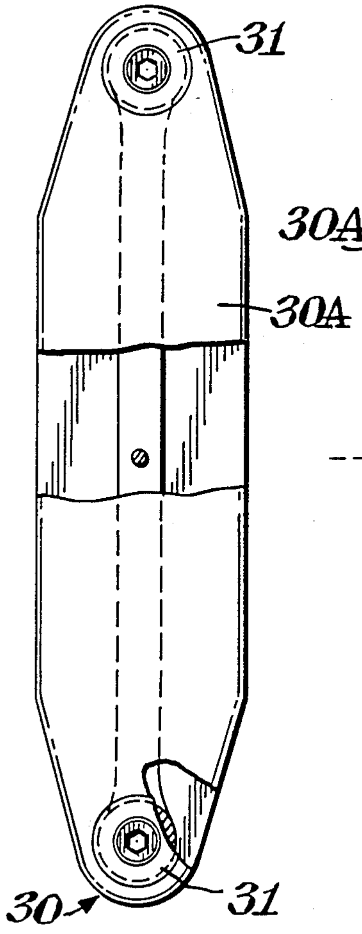
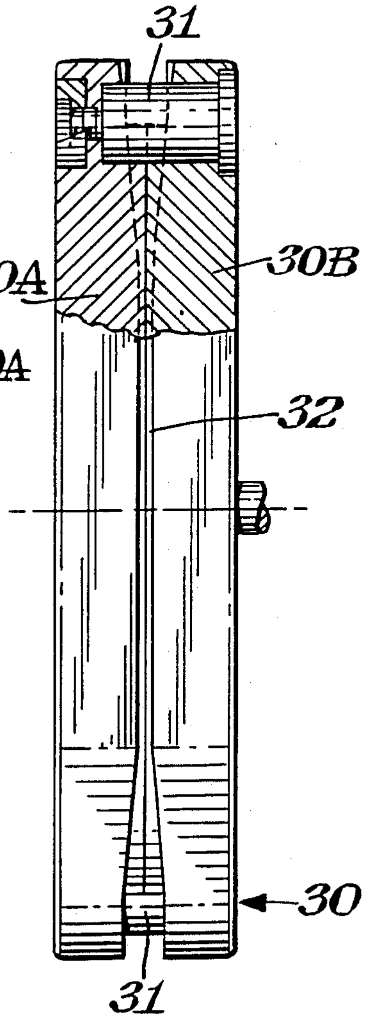
Fig. 15. Fig. 16.

WOUND ROTOR ELEMENT AND CENTRIFUGE FABRICATED THEREFROM

This application is a continuation of application Ser. No. 684,937 filed 12/21/84, now abandoned.

BACKGROUND OF THE INVENTION

1. Field of the Invention

This invention relates to a centrifuge rotor and, in particular, to a centrifuge rotor fabricated from an array of stacked wound radial rotor arm elements.

2. Description of the Prior Art

The trend in the fabrication of rotatable structures has been away from the use of conventional homogeneous materials, such as aluminum of titanium, and toward the use of reinforced fiber composite structures. Such structures are advantageous because they provide an increased strength-to-weight ratio with its attendant advantages over the conventionally fabricated homogeneous structures.

Typical use of such composite structures is found in the area of energy storage devices, such as fly-wheels. Exemplary of various alternate embodiments of such reinforced fiber composite rotatable structures are those shown in U.S. Pat. No. 4,458,400 (Friedericy et al., composite material flywheel hub formed of stacked fiber-reinforced bars), U.S. Pat. No. 3,672,241 (Rabenhorst, rotary element formed of layered strips of anisotropic filaments bound in a matrix), U.S. Pat. No. 3,698,262 (Rabenhorst, rotary element having a central hub with a multiplicity of anisotropic filaments), U.S. Pat. No. 3,737,694 (Rabenhorst, stacked discs of hub lamina each carrying an array of bent anisotropic fibers), U.S. Pat. No. 3,884,093 (Rabenhorst, fly-wheel fabricated of sector shaped members centrally connected to a hub, the thickness of each element being greater in the center than at the ends), and U.S. Pat. No. 4,028,962 (Nelson, fly-wheel fabricated of anisotropic material in a disc shape with the central portion of the disc being thinner than the edges).

The use of reinforced fiber material has also been found in other rotating structures, such as rotor blades and tooling. Exemplary of such uses are those shown in U.S. Pat. No. 4,038,885 (Jonda) and U.S. Pat. No. 4,255,087 (Wackerle, et al.). U.S. Pat. No. 3,262,231 (Polch) discloses the utilization of strands of high-tensile strength material, such as glass, as internal reinforcement of rotatable articles such as abrasive wheels.

In the area of centrifuge rotors the art discloses attempts to increase the strength-to-weight ratio. For example, U.S. Pat. No. 2,447,330 (Grebmeier) discloses an ultracentrifuge rotor formed of a metal material which is provided with slots which reduce the weight of the rotor. U.S. Pat. No. 3,248,046 (Feltman et al.) discloses a fixed angle centrifuge rotor formed by winding layers of glass material onto a mandrel. U.S. Pat. No. 4,468,269 (Carey) discloses a rotor with a plurality of rings surrounding a bowl-like body portion.

When using reinforced fiber materials it is advantageous to be able to arrange the fibers so that the maximum strength is oriented in a direction parallel to the direction in which maximum centrifugal stress is imposed on the fibers. That is, it is advantageous to be able to provide a three-dimensional spatial relationship of fibers that extend radially outwardly from the central axis of rotation. Most beneficially advantageous is to orient the fibers such that each fiber passes as close as possible through the rotational axis of the structure.

SUMMARY OF THE INVENTION

This invention relates to a reinforced fiber composite rotor structure capable of rotating a sample carried in a sample carrier at very high speeds. The structure in its broadest aspect comprises a generally elongated arm element having an elongated major axis. The arm element is formed from a plurality of turns of a fiber material arranged in generally parallel side portions connected through curved end turn portions. With such a structure the fibers forming each element pass as close as possible to the axis of rotation of the rotor and still provide continuous support for the sample carriers along the direction of maximum stress. The axes of each of the fibers in each of the side portions are substantially parallel to each other, parallel to the major axis of the elongated arm and substantially perpendicular to the rotor's axis of rotation. The height dimension of a side portion of the arm element is preferably less (i.e., the arm is thinner) at a point substantially mid-way along its length than at its curved end turn. The cross sectional area taken through a side portion of the arm element is substantially equal to the cross sectional area of the element taken through an end turn portion. A sample carrier is connectable to each arm element within each end turn thereof. The sample carrier may be tubular segment having a predetermined length which may be provided with a closed end in some instances. A drive connection is made to the arm mid-way between the ends of the arm. Transverse and/or inclined reinforcing wrappings and/or bracing fibers may also be provided.

In another aspect the rotor takes the form of one, two or more vertical tiers, each tier being formed of a stacked plurality of arm elements. In an M-place rotor, N arms are arranged to form an individual tier, where N equals one-half M. The major axis of each arm in a tier is offset from the major axis of the adjacent arm in the tier by an angle equal to 180° divided by N. In forming a stacked tier the height dimension $H_c$ of each rotor arm in the vicinity of its center is preferably about 1/N times the height dimension $H_E$ at its end, thus permitting the N arms defining a tier to exhibit a substantially uniform height profile to facilitate stacking. Of course the height dimension $H_c$ of each arm may be greater or less than the preferred height dimension ratio discussed above.

In rotors formed of at least two tiers, when the tiers are stacked selected ones of the elongated elements in each tier are vertically registered with respect to each other so that the sample carriers segments connectable at each end thereof may communicate to provide a sample receiving volume adapted to receive a specimen therein. Alternatively the volume may be defined by a continuous carrier that is secured through the vertically registered ends of the elements in each tier. A drive fitting having M faces on its periphery passes centrally and axially through the stacked tiers. Each arm element in each tier is connected along a different pair of opposed faces of the fitting.

A rotor in accordance with this invention may be implemented either in a fixed angle or a vertical tube configuration.

BRIEF DESCRIPTION OF THE DRAWINGS

The invention will be more fully understood from the following detailed description thereof, taken in connection with the accompanying drawings, which form a part of this application and in which:

FIG. 2 is a plan view of the wound rotor arm element shown in FIG. 1 while

FIG. 7 is a side elevational view of the rotor shown in FIG. 6 while

FIGS. 15, 16 and 17 are, respectively, a plan, side elevation and end view of a mold used in winding a rotor arm in accordance with the present invention.

DETAILED DESCRIPTION OF THE INVENTION

Figure 6:
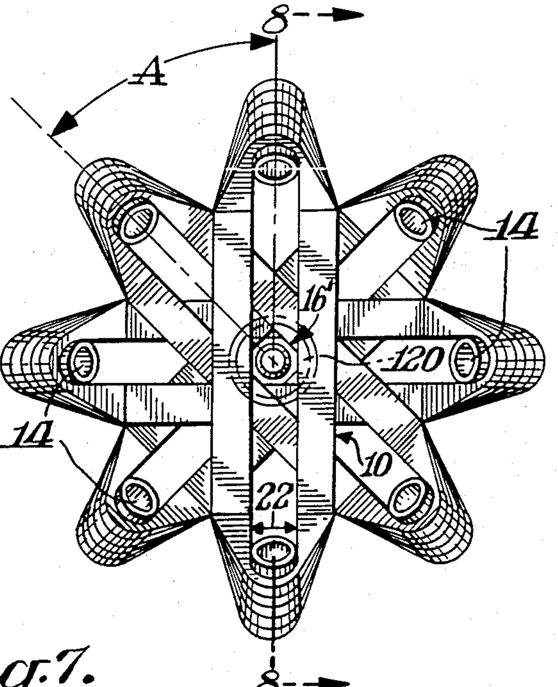
FIG. 6 is a plan view of an eight-place centrifuge rotor fabricated of a plurality of tiers of rotor arm elements stacked in accordance with the present invention.

Throughout the following detailed description similar reference numerals refer to similar elements in all figures of the drawings.

Figure 1:
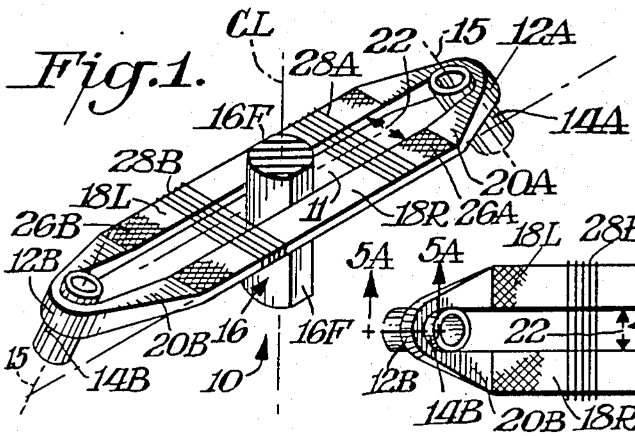
FIG. 1 is an isolated perspective view of an individual elongated wound radial rotor arm element in accordance with the present invention.

With reference to FIG. 1 shown is an isolated perspective view of an individual wound rotor arm element or arm 10 in accordance with the present invention. The arm 10 is a generally elongated element having a major axis 11. Each end 12A and 12B of the arm 10 is adapted to receive a sample carrier 14A and 14B respectively. The details of the sample carriers 14 and the manner in which they define a sample receiving volume are discussed herein. A drive connection 16 is mounted to the arm 10 at a point midway between the ends 12A and 12B thereof. Although it should be appreciated that the drive connection 16 may be provided at any convenient location on the arm 10 providing that symmetry about the centerline CL is maintained. In FIG. 1 the drive connection 16 is shown as a member having opposed flat surfaces 16F which engage the arm 10. The drive connection 16 may take any suitable form, as discussed herein, and is arranged to permit the arm 10 to be mounted on a suitable drive spindle or the like for rotation about the axis of rotation CL extending substantially perpendicular to the major axis 11 of the arm 10.

Figure 2:
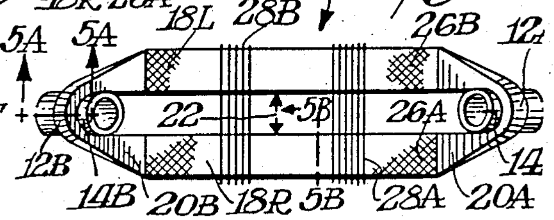
Figure 4:
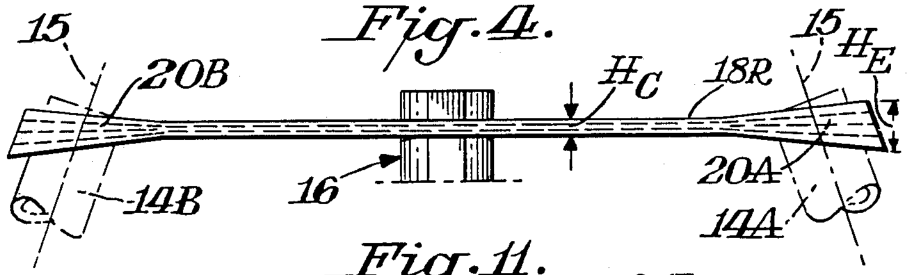
FIG. 4 is a side elevational view of the rotor arm element shown in FIGS. 2 and 3.

The arm 10 is formed from a plurality of layered turns of an anisotropic fiber material. The arm 10 is wound in a manner to be discussed so as to provide generally parallel side portions 18R and 18L which are connected through curved end turn portions 20A and 20B. Each sample carrier 14A and 14B is respectively positioned within its associated end turn portion 20A and 20B. The side portions 18 are spaced by a gap 22 having a predetermined dimension. The gap 22 may remain substantially equal to the diametric dimension of the carrier 14, as shown in FIGS. 1 and 2. Preferably, however, the fibers of the arm 10 may partially wrap about the carrier 14, as shown in FIG. 3, to define a narrower gap 22′.

Figure 8:
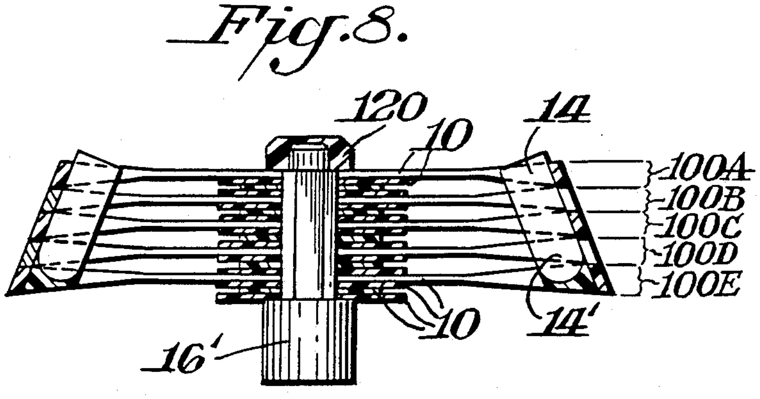
FIG. 8 is a section view taken along section lines 8—8 of FIG. 6.
Figure 10:
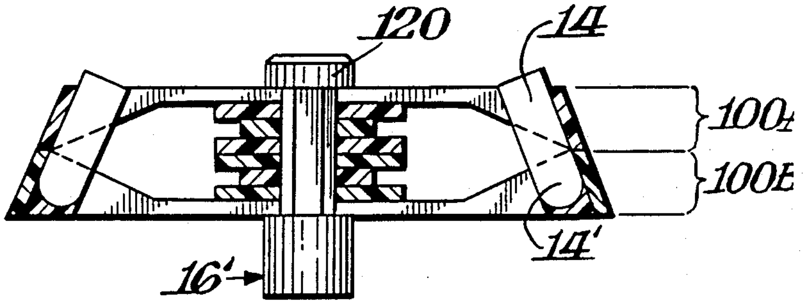
FIGS. 9 and 10 are alternate configurations of a rotor formed of stacked tiers of wound arm elements in accordance with the present invention.
Figure 9:
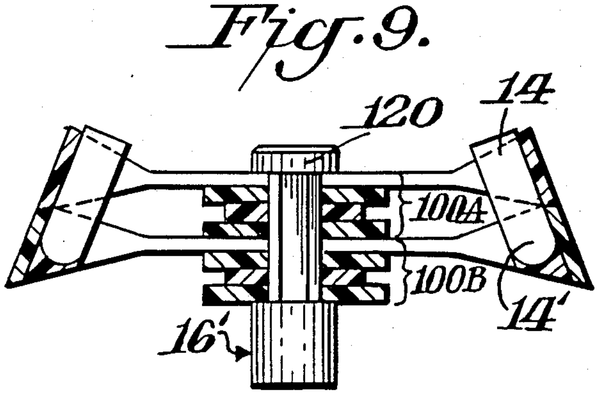

Each sample carrier 14 is a substantially cylindrical tubular member which may be mounted such that the axis thereof is either parallel to or slightly inclined inwardly with respect to the axis of rotation CL to respectively define a vertical tube rotor (as shown, e.g., in FIGS. 11 and 12) or a fixed angle rotor as shown in FIGS. 1, 2, 3 and 4. Each carrier 14 may be formed as an open or a closed ended member. A closed ended tubular member 14′ is shown in FIGS. 8 through 10. The sample carrier may be provided during fabrication of the arm or thereafter. The carrier 14 may directly receive a sample under test or may be sized to receive a separate container (as a test tube) which carries the sample under test. As is developed herein (FIGS. 8, 9 and 10) a rotor may be formed from at least two stacks of tiers of arms. Each tier is itself formed from a stack of individual arms. In this instance selected arms in each tier lie in vertical registration. A sample receiving volume may be defined by the registration of segmented carriers or by the insertion of an integral carrier 14 into the registered ends of the arms.

Figure 3:
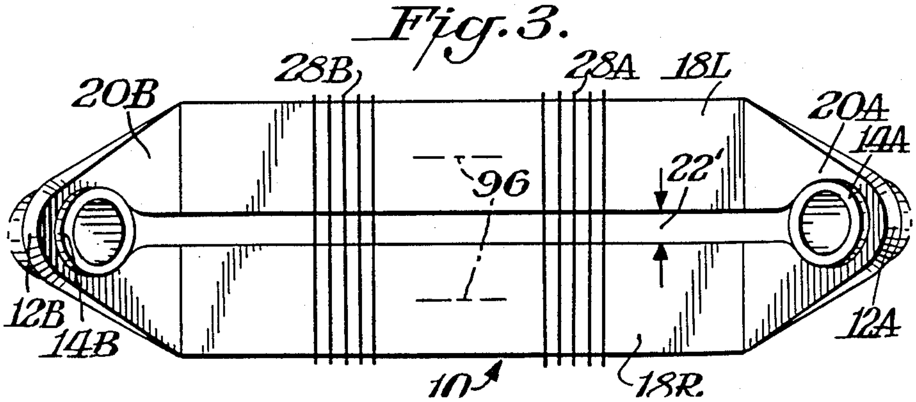
FIG. 3 is a plan view of an alternate construction of such an arm element.

As seen with reference to FIGS. 1 and 3, the arm 10 is wound such that the side portions 18 are thin rectanguloid members which merge into the flaring, substantially horseshoe-shaped curved end turn portions 20A, 20B. As suggested in FIG. 4 by the dashed lines, the individual fibers in the side portions 18 are arrayed such that their axes are parallel to each other and to the major axis 11 of the arm 10 while the fibers diverge from each other in the end turn portions 20A, 20B.

Figure 5A:
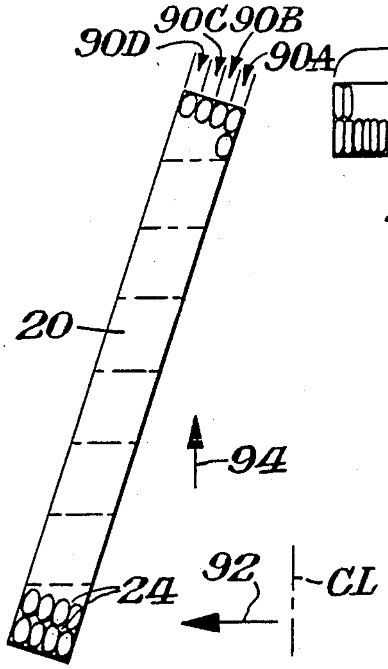
FIGS. 5A and 5B are, respectively, sectional views taken along section lines 5A—5A and 5B—5B in FIG. 2.
Figure 5B:
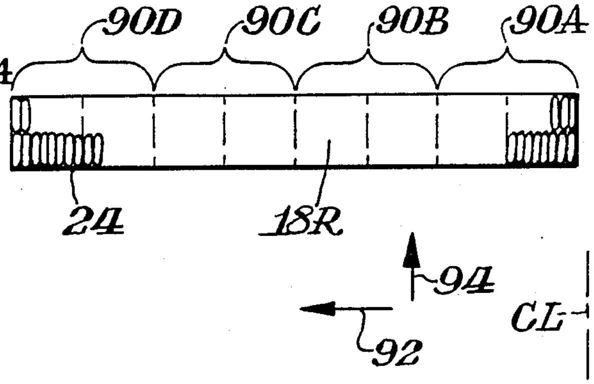

The fibers are surrounded and supported in a suitable resin-based support matrix 24 best seen in FIGS. 5A and 5B. The arms 10 exhibit a profile in which the height dimension $H_c$ (FIG. 4) of a side portion 18 (measured in the central region between the flared ends) is less than the height dimension $H_E$ of an end portion turn 20A, 20B. It should be understood, however, that the profile of the arm element 10 need not be limited to that shown in the Figures. For example, the rectanguloid central region of the side portions of the arm may extend for a lesser distance along the length of the side portion and the taper of the end turn portions may concomitantly increase in length and become more gradual.

Figure 11:
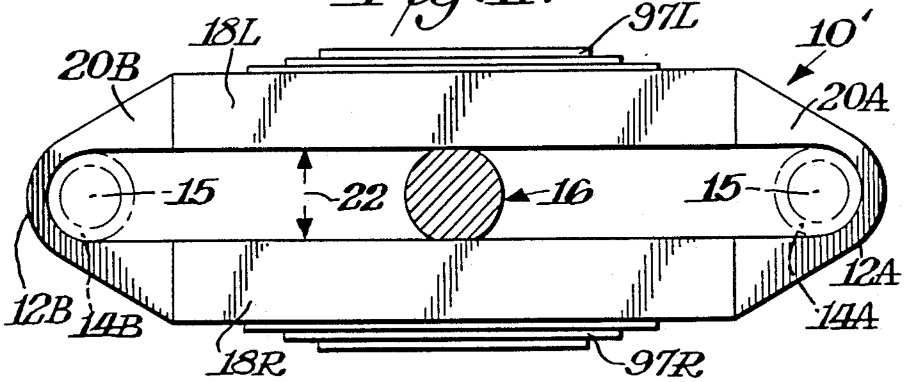
FIGS. 11 and 12 are, respectively, plan and side elevational views (respectively similar to FIG. 2 or 3 and FIG. 4) illustrating a wound radial arm element in accordance with this invention adapted for the fabrication of a vertical tube centrifuge rotor.
Figure 12:
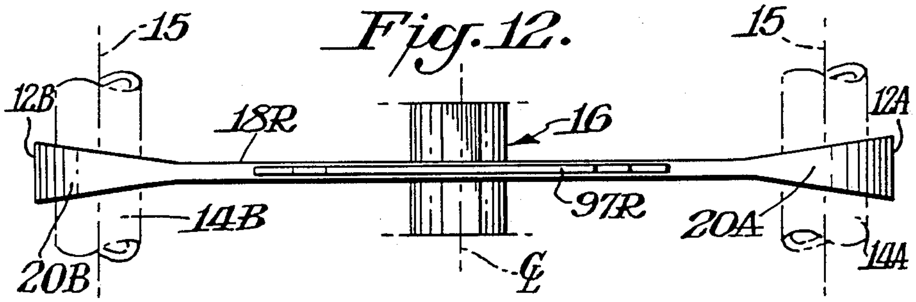

The arm 10 shown in FIGS. 1 through 4 are configured for the fabrication of a fixed angle centrifuge. However, for use in a vertical tube centrifuge arms 10′ such as shown in FIGS. 11 and 12 may be used. The arms 10′ are identical in all material respects to that discussed in FIGS. 1 through 4, except that the sample carriers 14 are supported in their associated end turn portions 20A, 20B so that the axis 15 of the carrier 14 is parallel to the axis of rotation CL. In the fixed angle case shown in FIGS. 1 through 4, the axes 15 of the carriers 14 are inclined at a predetermined fixed angle to the axis CL. It should be noted that the arm 10′ may exhibit either gap configuration 22, 22′ as shown in FIG. 2 or 3.

Since the transverse centrifugal forces in the region of the drive connection 16 may have a tendency to separate the parallel side portions 18R, 18L of the arm in some instances it may be desired to provide wrappings formed of arrays of transversely wound fibers 28A and 28B disposed across the sides 18R and 18L. In addition or as an alternative reinforcing fibers 26A and 26B located in the transition region between the sides 18 and the end turns 20A, 20B may be provided. The windings 26 and/or 28 may be used with any embodiment of the arms 10 or 10' shown herein but are illustrated only in FIGS. 1 through 3 for clarity of illustration.

The arm 10 or 10' may be fabricated in any convenient manner as described in connection with FIGS. 13 through 20. For example, a mold 30, preferably formed in conjoinable sections 30A and 30B (as seen in FIGS. 15, 16 and 17), is provided with a peripheral groove 32 formed in the three-dimensional shape of an individual arm 10 or 10'. The sections 30A and 30B are releasably conjoined by end posts 31. The depth of the groove defined about the periphery of the conjoined sections 30A and 30B corresponds to the width of the side portions 18 and end portions 20A, 20B of the arm 10 or 10'. As seen from FIGS. 13 and 14 the mold 30 is mounted for rotational movement about an axle 38 journaled in a fixture 40 mounted on a work table 42. Motive energy for rotation of the mold 30 is derived from a motor 44 conveniently mounted to the fixture 40. The motor 44 causes the mold 30 to rotate in the direction of the arrows 46.

A strand of high-tensile strength anisotropic fiber is wrapped in the groove 32 around the mold 30 so as to build-up substantially uniform fiber layers. The fiber layers are arranged atop each other from the base of the groove in a manner akin to the winding of a fishing reel with line with the axis of the individual fibers in the side portions of the arms being substantially parallel to each other with the fibers in the end turn diverging as discussed. Suitable for use as the fiber is 1140 denier aramid fiber such as that manufactured by E. I. duPont de Nemours and Company, Inc., and sold under the trademark KEVLAR®.

The fiber wrapped onto the mold is coated with any suitable matrix 24 (FIGS. 5A, 5B) such as epoxy, thermoplastic or other curable resin which imparts a tackiness to the exterior of the fiber and permits the fiber to adhere to adjacent turns in adjacent layers.

The fiber is taken from a supply spool 48 mounted on a commercial unwind 50 such as that sold by Compensating Tension Controls, Inc. under model 800C 012. The fiber passes over a tensioning arm array 52 and through a vertical guide roll 54 to a horizontal grooved guide roller 56. The roller 56 is mounted for traversing movement in the direction of arrows 58 on a shaft 60 of a traverse 62. The fiber passes partially around the roller 56. The roller 56 may be provided with a nonstick surface to preclude adhesion. The guide roller 56 is traversed horizontally (i.e., in a direction parallel to the axis of the shaft 38) as needed to distribute fiber in the groove 32 on the mold 30.

Figure 18:
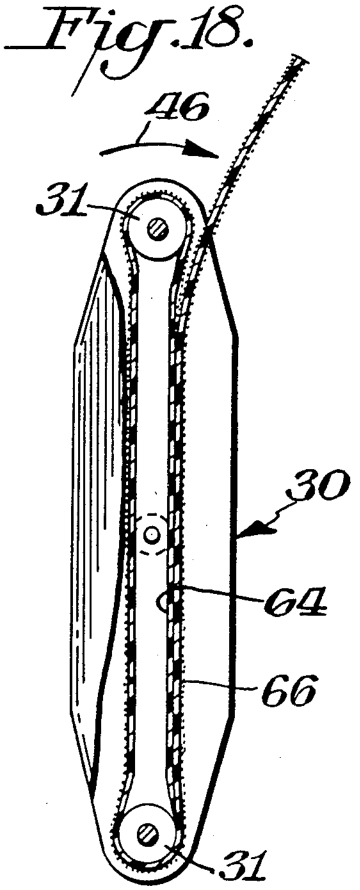
FIGS. 18, 19 and 20 illustrate various procedures used in winding a rotor arm in accordance with the present invention.
Figure 19:
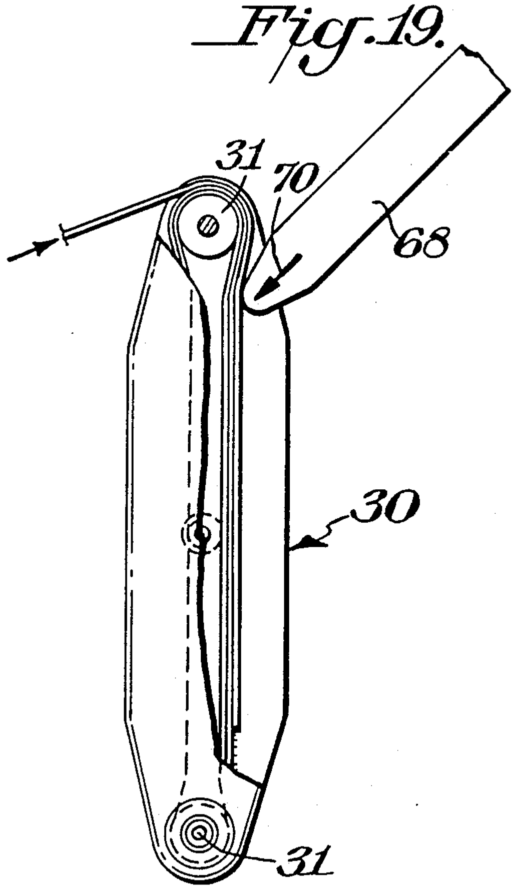

As seen from FIGS. 18 and 19, the base of the groove 32 has been coated with a tacky material, such as a layer of double-stick tape 64. The leading end 66 of the fiber is pressed against the exterior surface of the tape 64 and the mold rotated in the direction 46. The fiber adheres to the tape 64 forming the base fiber layer. If the arm is to be provided with a narrowed gap 22' (FIG. 3) the initial turns of fiber are guided onto the tape 64 using an implement 68 (FIG. 19) which is urged in an inward direction 70 of the mold 30 to cause the initial layers of the fiber to enter the groove 32 and be forced into place against the tape 64 at the bottom. After a number of initial turns forms a predetermined number of layers the implement 68 is no longer needed.

Figure 13:
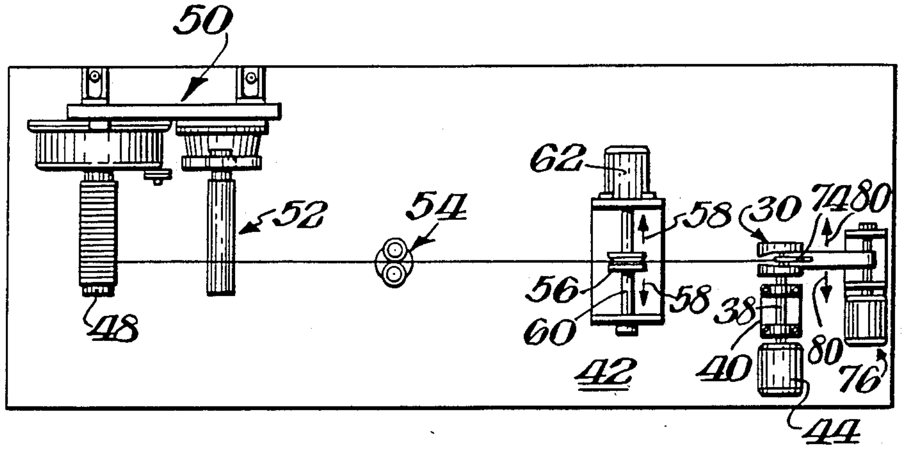
FIGS. 13 and 14 are, respectively, a plan and side elevation view of an arrangement for winding a rotor arm in accordance with the present invention.
Figure 14:
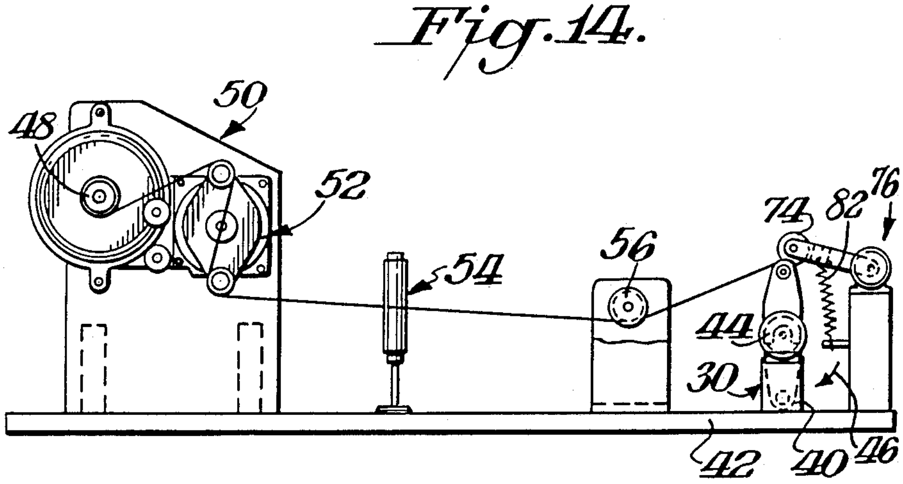
Figure 20:
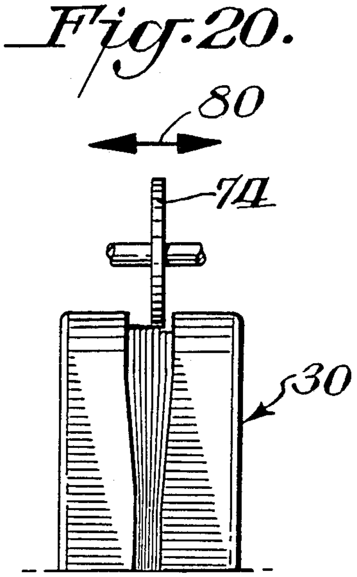

A pressing roller 74 is mounted on a fixture 76 for traversing movement in the directions 80 (parallel to the direction 58) (FIG. 13). The roller 74 is biased by a spring 82 to press the fiber to preceding layers. The traverse of the roller 74 is synchronized with the rotation of the mold to impart a level distribution to the fiber at all points of the mold (FIG. 20). The mold sections are preferably bolted in place (by bolts 33 (FIG. 16) extending through posts 31) to apply pressure to the fiber.

After winding the wound structure is generally cured in an autoclave at a temperature and for a time sufficient to release any volatile constituents and/or to cure the matrix so that the resultant wrapped structure becomes a rigid self-supporting member. Thereafter, the mold is disassembled and the composite structure so formed removed. The sample carriers 14 (if any) are then secured into the end turn regions 20A, 20B of the arm by any suitable means of attachment, such as epoxy glue or the like. Thereafter, the wrappings 26, 28 are wound about the arm. It should be noted that the arm 10 or 10' may be wound using ribbons, braids or twisted elements or other textile structural forms. These alternatives lie within the contemplation of the present invention.

As seen from FIGS. 5A and 5B the individual fibers in each layer of fiber are arranged in complimentary positions in the end portions 20A, 20B and the side portions 18R, 18L the arm. Owing to the different shapes of the side portion 18R and the end turn portion 20 of the arm, individual fibers may shift their relative position with respect to each other as they travel from the central region of the side portions 18R, 18L of the rotor arm 10 (or 10') to the end turn portions. The general relationship of fibers in the end and side turn regions is indicated in FIGS. 5A and 5B. As seen in these Figures, in a side portion 18R (FIG. 5B) each of the individual layers 90A through 90D of fibers are arranged to define a predetermined dimension measured in the radial direction 92 from the center line CL that is greater than the corresponding dimension measured in the same direction for the fiber layers in an end turn region (FIG. 5A). Conversely, in the end turn region 20 as shown on these Figures the fiber layers 90A through 90D exhibit a dimension in the direction 94 parallel to the center axis CL that is greater in the end turn region than the corresponding dimension in the side region as measured in FIG. 5B. However, it is noted that the surface area of a cross section taken through a side portion 18R (FIG. 5B) is equal to the surface area of a cross-section of the arm taken through an end turn 20 (FIG. 5A). Basically there is a reorientation of the fibers during the transition from the end region 20 (FIG. 5A) to the side region 18R (FIG. 5B). The fibers in the innermost layer 90A of the end turn portion (FIG. 5A) reorient to form sublayers 90A indicated in the side portion 18R (FIG. 5B). A similar orientation occurs with layers 90B, 90C and 90D. It should be understood that any predetermined number of layers of fibers may be used, and that the four layers shown in FIGS. 5A and 5B are selected only for convenience of illustrating the concepts involved.

Several desirable winding modifications can be effected. For example, the structures above described can be wound using more than one strand of fiber with the different strands having a relatively higher specific modulus of elasticity being disposed in radially outer layers. By way of simplified example, with reference to FIGS. 5A and 5B, the inner layer 90A (or innermost layers, as the case may be) may be wound using a fiber having a first specific modulus of elasticity. The intermediate layers, e.g., the layers 90B and 90C, may thereafter be wound atop the inner layer(s) using a fiber having a relatively greater specific modulus of elasticity (i.e. stiffer). The outermost layer 90D (or outermost layers) may be wound with the fiber having a yet greater specific modulus of elasticity (i.e., stiffer still). Such a constructional arrangement is believed preferable since it more evenly distributes the ability of individual strands and layers of strands to withstand centrifugal stresses. In the above example the innermost layer may be formed of a K-29 KEVLAR® aramid fiber, the intermediate layers of the K-49 KEVLAR® aramid fiber while the outer layer may be formed of AS4 carbon filament fibers such as that manufactured by Hercules Incorporated, Wilmington, Del.

In the alternate embodiment of the arm shown in FIG. 3 the arm 10 is wrapped in a manner which closes or narrows the gap 22' between side portions 18. This mode of wrapping ensures that the total length of a fiber in a layer on the inner side of a reference line or neutral axis 96 is as close to being equal as possible to the length of a fiber in an outer layer spaced corresponding outwardly with respect to the neutral axis 96. Such a winding pattern has a tendency of imparting a more uniform load capability to the fibers.

Other possible fiber arrangements may include variations in the number of fibers in different locations. For example, additional overwrapped systems (similar to the wrappings 28) in which additional fibers may be added to carry secondary loads.

In another example a plurality of additional bracing fibers 97R, 97L are oriented substantially parallel to the axis of the fibers in the side portions and are placed in high stress regions of the arm to reduce the stress. Generally the fibers 97R, 97L are disposed substantially midway along the radial outer surface of each side portion 18 of the arm. The additional fibers 97R, 97L could be of the form of ribbons, braids or twisted elements.

Figure 7:
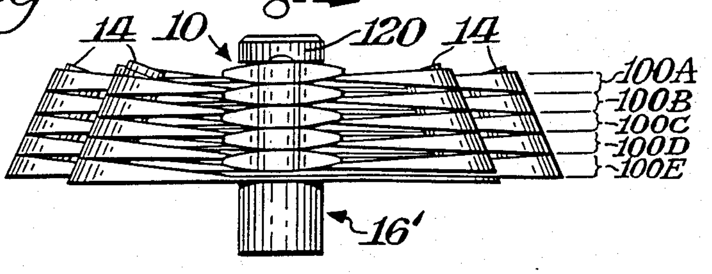
Figure 7A:
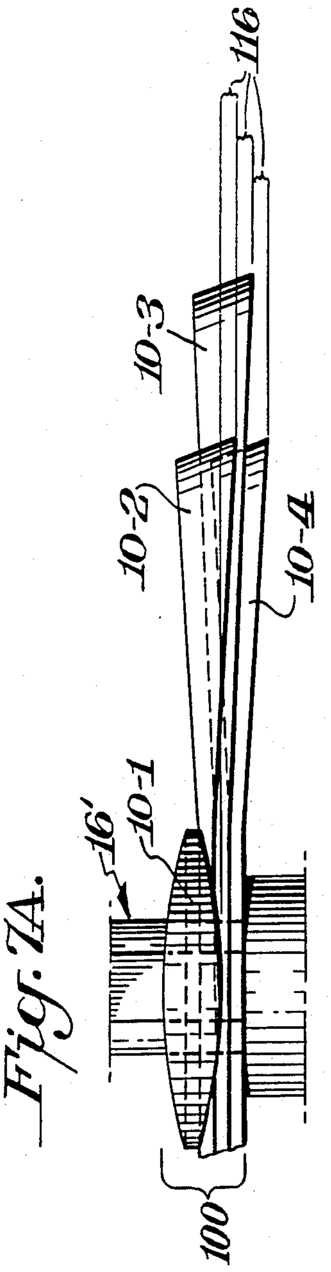
FIG. 7A is an enlarged view of the rotor more clearly illustrated the stepped relationship of the ends of the arms.

Although, with symmetric loading, the individual arm element 10 or 10' may itself act as a sample carrying device, in accordance with a more preferred embodiment of this invention shown in FIGS. 6 through 8 a plurality of individual arm elements 10 or 10' are stacked atop each other to form a tier 100 having a sample carrying capacity numbered in even number multiples in excess of two. A typical one of the tiers 100 is shown in FIG. 7A. Thus, a M place centrifuge rotor, where M is an even number greater than two, may be formed from a tier of N arms 10 or 10' angularly arranged with respect to each other about the central axis CL, where N equals one-half M. Thus, for example, a four-place centrifuge tier (M equals four) may be constructed from two radial arms 10 or 10'. The angular spacing between adjacent axes of the arms 10 in the tier is defined by an angle A equal to 180° divided by N, i.e., ninety degrees. As a further example, a six place rotor (M equals six) is defined using three arms (N equals three) with the axis of the arms offset from each other by an angle A of sixty degrees. An eight-place rotor may be defined using a tier containing four stacked arms at an angle A of forty-five degrees as shown in FIGS. 6 through 10.

When used to form a rotor from single or multiple stacked tiers of arms the height dimensions $H_c$ and $H_E$ of each individual arm 10 or 10' are related such that the height dimension $H_E$ of an end turn portion 20 of an arm 10 or 10' is substantially equal to N times the height dimension $H_c$. Although this relationship is preferred the relationship between the heights $H_c$ and $H_E$ may be related by any predetermined multiple or fraction of the number N. The preferred structural relationship will permit receipt of that number N of arms necessary to form a complete rotor tier 100 to be stacked and received in the overlying central regions where the midpoints of each arm in the tier 100 are in proximity so that the adjacent arms may oriented in the above-described angular relationship. It should be noted that in practice it may be necessary to provide a spacer formed with a layer of bonding material on the top and bottom surfaces intermediate each arm in the tier. Such a spacer would thus mandate that the height $H_c$ be slightly less than 1/N of the height $H_E$ to accommodate the spacer.

In the central region where the N arms in a tier cross the vertical registration of the arms forms an M-sided space. Into this space a drive connection 16' (FIG. 6) having at least M corresponding surfaces may be introduced. The radial inner surface of both side portions of each arm in the tier is connected directly or through an intermediate element to one of a different opposed pair of surfaces on the drive connection 16'.

In a further aspect of the invention, a rotor may be formed from a stacked plurality of tiers 100 of arms 10 or 10'. This structure may be best understood by reference to FIGS. 6 through 8 which respectively show a plan, side elevational and a sectional view of an eight place centrifuge rotor fabricated from five stacked tiers 100A through 100E of stacked individual arms 10 or 10'. Each tier 100A through 100E contains four arms 10 or 10'. As seen in these Figures, such a rotor is arranged such that each arm 10 or 10' in each tier 100 is in vertical registration with respect to the corresponding angularly oriented arm in the next vertically adjacent tier. The sample carriers 14 provided at the ends of the same angularly oriented arm in each tier 100 are registered to define an elongated, enclosed sample receiving cavity. The carriers 14 disposed in the tiers 100A through 100D are open ended tubular members while the tubular member 14' in the tier 100E is a closed ended tubular member. Alternatively an integral elongated sample carrier may be introduced into the registered ends of the arms and secured in place.

Due to the vertical stacking arrangement the ends of the arms forming a tier 100 are vertically stepped. This stepped effect is believed best shown in FIG. 7A where it is seen that the lower surface of the each arm 10 or 10' in a typical tier 100 is vertically offset by a distance 116. In FIG. 7A, to more clearly illustrate this effect, only the arms 10-1, 10-2, 10-3 and 10-4 forming the tier 100 are illustrated.

The sample container may be oriented vertically, i.e., its axis parallel to the centerline CL, or inclined at a fixed angle toward the centerline CL. In the instance of a stacked fixed angle rotor as shown in FIGS. 6 through 8, the arms forming each tier are elongated as one proceeds from the upper tier 100A toward the lower tier 100E. Accordingly, the molds used to fabricate the arms for each individual tier must be modified accordingly. Alternatively, the arms may be the same length but the segments of the carrier or the elongated carrier may be vertical along the surface reserved in the ends turns and provided with an angled inner cavity.

As seen from FIGS. 9 and 10, a rotor may be formed from any predetermined number of tiers. Each of these Figures disclose a rotor having two tiers 100A and 100B. However, the arms 10 or 10' forming each tier 100A and 100B may be stacked in any predetermined manner as long as their ends cooperably support the sample container. FIG. 9 discloses a symmetrical stack in which the corresponding arm 10 or 10' in each tier 100A or 100B occupy the same relative position. In the stack shown in FIG. 10, the corresponding arms 10 or 10' in each tier 100A and 100B occupy different relative positions in the stack forming each tier.

By whatever stacking arrangement utilized and by whatever number of tiers desired the resultant stacked combination of arms is secured together on the drive connection 16' in any convenient manner. For example, a threaded fastener 120 (FIG. 7) may be used. Alternatively, the arms may be connected to each other by adhesive bonding, by a melted thermoplastic matrix, or by friction provided by pressure from the fastener.

In view of the foregoing there has been disclosed an individual wound radial arm element and a centrifuge rotor fabricated from a tier of stacked arms or from a plurality of tiers of stacked arms in which the anisotropic fibers in each arm are oriented in a direction arranged to absorb to their maximum the load carrier by that arm. The rotors described herein are primarily used in ultracentrifuge instruments wherein the rotational speed is in excess of 50,000 revolutions per minute, although it should be understood that their use is not limited exclusively thereto.

Those skilled in the art, having the benefit of the teachings of the present invention may effect numerous modifications thereto. Such modifications are, however, to be construed as lying within the scope of the present invention as set forth in the appended claims.

What is claimed is:

1. A rotor apparatus rotatable about an axis of rotation comprising:

a generally elongated arm having a major axis, the arm being formed from a plurality of turns of fiber wound in generally parallel side portions connected through curved end turn portions, the fiber in each side portion being generally parallel to the major axis, the height dimension of a side portion of the arm at a point substantially midway along its length being less than the height dimension of the arm at its end turn portions; and a sample carrier positioned within each end turn portion.

2. The rotor of claim 1 wherein a cross-sectional area taken through a side portion is substantially equal to a cross-sectional area taken through an end turn portion.

3. The rotor of claim 1 wherein the specific modulus of elasticity of a fiber lying at a predetermined radial distance from the axis of rotation is greater than the modulus of elasticity of a fiber lying radially inwardly of the predetermined radial distance.

4. The rotor of claim 1 wherein the length of the fiber in a layer of a side portion disposed a predetermined distance radially inwardly of a reference axis extending through the side portion is substantially equal to the length of the fiber in a layer of the side portion disposed the same predetermined distance radially outwardly of the reference axis.

5. The rotor of claim 1 further comprising a wrapping of fibers extending transversely across the side portions of the arms.

6. The rotor of claim 1 further comprising a plurality of bracing fibers disposed radially outwardly of each side portion generally midway therealong.

7. The rotor of claim 1 wherein the fiber is coated with a matrix material which is curable to impart rigidity to the arm.

8. An M place centrifuge rotor comprising a tiered stack of N-arms, where N equals one-half M, each arm being a generally elongated member having a major axis, each arm being formed from a plurality of turns of fiber wound in generally parallel side portions connected through curved end turn portions, the fiber in each side portion being generally parallel to the major axis, the height dimension of a side portion of each arm at a point substantially midway along its length being less than the height dimension of the arm at its end turn portions.

9. The rotor of claim 8 further comprising a sample carrier positioned within each end turn portion.

10. The rotor of claim 8 wherein the major axis of each of the N arms of the tiered stack is angularly offset from the axis of an adjacent arm by an angle equal to 180° divided by N.

11. The rotor of claim 9 wherein the major axis of each of the N arms of the tiered stack is angularly offset from the axis of an adjacent arm by an angle equal to 180° divided by N.

12. The rotor of claim 11 wherein the height dimension of each arm in the stacked tier taken substantially at the central portion thereof is equal to 1/N times the height dimension of the arm at its end turn portions.

13. The rotor of claim 9 wherein the height dimension of each arm in the stacked tier taken substantially at the central portion thereof is equal to 1/N times the height dimension of the arm at its end turn portions.

14. The rotor of claim 10 wherein the height dimension of each arm in the stacked tier taken substantially at the central portion thereof is equal to 1/N times the height dimension of the arm at its end turn portions.

15. The rotor of claim 8 wherein the height dimension of each arm in the stacked tier taken substantially at the central portion thereof is equal to 1/N times the height dimension of the arm at its end turn portions.

16. An M-place centrifuge rotor comprising:

a first and second tiered stack of N arms each, where N equals one-half M, the first and second tiered stacks being themselves disposed in stacked relationship;

each arm in the upper of the tiered stacks being arranged in vertical registry with an arm in the lower of the tiered stacks, each arm in each tiered stack being a generally elongated member having a major axis, each arm being formed from a plurality of turns of fiber wound in generally parallel side portions connected through curved end turn portions, the fiber in each side portion being generally parallel to the major axis, the height dimension of a side portion of each arm at a point substantially midway along its length being less than the height of the arm at its end turn portions.

17. The rotor of claim 16 further comprising sample carriers received within the end turn portions of the registered arms.

18. The rotor of claim 16 wherein the axis of each of the N arms of each tiered stack is angularly offset from the axis of an adjacent arm of its tiered stack by an angle equal to 180° divided by N.

19. The rotor of claim 17 wherein the axis of each of the N arms of each tiered stack is angularly offset from the axis of an adjacent arm of its tiered stack by an angle equal to 180° divided by N.

20. The rotor of claim 19 wherein the height dimension of each arm in each tiered stack taken substantially at the central portion thereof is equal to 1/N times the height dimension of the arm at its end turn portions.

21. The rotor of claim 17 wherein the height dimension of each arm in each tiered stack taken substantially at the central portion thereof is equal to 1/N times the height dimension of the arm at its end turn portions.

22. The rotor of claim 18 wherein the height dimension of each arm in each tiered stack taken substantially at the central portion thereof is equal to 1/N times the height dimension of the arm at its end turn portions.

23. The rotor of claim 16 wherein the height dimension of each arm in each tiered stack taken substantially at the central portion thereof is equal to 1/N times the height dimension of the arm at its end turn portions.

* * * * *